(12) United States Patent
Miles et al.

(10) Patent No.: US 9,880,539 B2
(45) Date of Patent: Jan. 30, 2018

(54) PROGRAMMABLE CONTROL MODULE FOR AN INDUSTRIAL DEVICE

(75) Inventors: Scott P. Miles, Belgium, WI (US); Teck Siang Tan, Singapore (SG); Daniel Joseph Middlestetter, Lyndhurst, OH (US); Alfred David Bassett, West Bend, WI (US); See Yong Koh, Singapore (SG)

(73) Assignee: ROCKWELL AUTOMATION ASIA PACIFIC BUSINESS CENTER PTE. LTD., Singapore (SG)

( * ) Notice: Subject to any disclaimer, the term of this patent is extended or adjusted under 35 U.S.C. 154(b) by 688 days.

(21) Appl. No.: 13/397,607

(22) Filed: Feb. 15, 2012

(65) Prior Publication Data

US 2012/0221155 A1   Aug. 30, 2012

(30) Foreign Application Priority Data

Feb. 24, 2011   (SG) .................................. 201101326

(51) Int. Cl.
  *G05B 19/00*   (2006.01)
  *G05B 19/042*   (2006.01)

(52) U.S. Cl.
  CPC ................................ *G05B 19/0423* (2013.01)

(58) Field of Classification Search
  CPC .................................................... G05B 15/00
  USPC ........................................................ 700/286
  See application file for complete search history.

(56) References Cited

U.S. PATENT DOCUMENTS

| | | | |
|---|---|---|---|
| 4,143,417 A * | 3/1979 | Wald ....................... | G06F 1/263 345/168 |
| 6,839,790 B2 * | 1/2005 | Barros De Almeida ............. | H04L 12/5692 710/305 |
| 7,538,502 B2 * | 5/2009 | Hongo ..................... | B41J 11/42 318/400.21 |
| 2004/0113757 A1 * | 6/2004 | White et al. ............. | 340/310.01 |
| 2004/0260470 A1 * | 12/2004 | Rast .............................. | 701/300 |
| 2005/0280511 A1 * | 12/2005 | Yokoyama et al. ......... | 340/10.5 |
| 2006/0096385 A1 * | 5/2006 | Wenski ........................... | 73/800 |
| 2006/0133412 A1 * | 6/2006 | Callaghan ..................... | 370/465 |
| 2006/0206246 A1 * | 9/2006 | Walker ........................... | 701/16 |
| 2007/0129814 A1 * | 6/2007 | Dionne ............................ | 700/2 |
| 2007/0203590 A1 * | 8/2007 | Matsumoto ..................... | 700/84 |
| 2008/0041125 A1 * | 2/2008 | Poppe ............... | H01R 13/6397 70/57 |
| 2008/0053917 A1 * | 3/2008 | Larson et al. ................ | 210/741 |

(Continued)

OTHER PUBLICATIONS

Singapore Search Report & Written Opinion of Application No. 201101326-5; pp. 9.

*Primary Examiner* — Christopher E Everett
(74) *Attorney, Agent, or Firm* — Fletcher Yoder, P.C.

(57) ABSTRACT

A control module for an industrial device is provided. The control module includes a coupling feature configured to facilitate removable attachment of the control module with the industrial device and a communicative coupling feature configured to facilitate communication between the control module and the industrial device when coupled with a corresponding communicative coupling feature of the industrial device. The control module also includes a port configured to communicatively couple with a connector capable of supplying power and data communication, wherein the port is configured to receive power via the connector and exchange data with a computer via the connector.

16 Claims, 4 Drawing Sheets

(56) References Cited

U.S. PATENT DOCUMENTS

2010/0076616 A1\* 3/2010 Kagan ................ G01R 19/2513
  700/295
2010/0238003 A1\* 9/2010 Chan et al. .............. 340/310.11
2011/0040415 A1 2/2011 Nickerson et al.

\* cited by examiner

PROGRAMMABLE CONTROL MODULE FOR AN INDUSTRIAL DEVICE

CROSS REFERENCE TO RELATED APPLICATIONS

This application claims priority from and the benefit of Singapore Patent Application No. 201101326-5, filed on Feb. 24, 2011; entitled "Programmable Control Module for An Industrial Device", which is herein incorporated by reference.

BACKGROUND

The invention relates generally to programmable devices, such as those used in industrial automation and control systems. More particularly, embodiments of the present invention relate to equipment and techniques for programming, configuring, or otherwise controlling such devices.

Industrial automation and control systems are known and are in use for controlling factory automation and the like. Such systems include various components such as programmable logic controllers, semiconductor power electronic circuits, power supplies, motor starters, relays, and so forth that are utilized to monitor and control a process or system. Typically, in operation, a programmable logic controller or control module examines a series of inputs reflecting the status of a controlled process or feature and changes outputs affecting control of the controlled process or feature.

In general, components such as motor drives, programmable logic controllers, and the like are often manufactured to be suitable for a wide range of applications. Therefore, such devices usually include general-purpose hardware and software components that provide the device with a high degree of versatility. Before putting the industrial device into service, the device may be custom programmed with desired operating characteristics. In some cases, the industrial device may be programmed by the manufacturer, the user of the device, an original equipment manufacturer (OEM), system integrator, or other service provider. Moreover, during its lifetime, a typical programmable device may be re-programmed several times to adjust to emerging needs.

In traditional automation and control systems, industrial devices are programmed using pluggable devices that include features such as electrically erasable programmable read-only memory (EEPROMs), battery powered human interface modules (HIMs), and universal serial bus (USB) devices. It is now recognized that connection of such devices with some industrial devices requires electrical isolation from high voltage circuitry of the respective industrial devices. Unfortunately, electrical isolation circuits capable of providing isolation from high voltage circuitry are typically expensive, which increases overall costs of certain industrial devices.

BRIEF DESCRIPTION

According to one embodiment of the present invention, a control module for an industrial device is provided. The control module includes a coupling feature configured to facilitate removable attachment of the control module with the industrial device and a communicative coupling feature configured to facilitate communication between the control module and the industrial device when coupled with a corresponding communicative coupling feature of the industrial device. The control module also includes a port configured to communicatively couple with a connector capable of supplying power and data communication, wherein the port is configured to receive power via the connector and exchange data with a computer via the connector.

In accordance with another aspect, an industrial automation system is provided. The industrial automation system includes an industrial device and a control module removably coupled with the industrial device such that the control module communicates with and receives power via the industrial device. The industrial automation system includes a port integral with the control module and configured to communicatively couple with a connector capable of supplying power and data communication, wherein the port is configured to receive power via the connector and exchange data with a computer via the connector.

In accordance with another aspect, a method for programming a control module of a high voltage industrial device is provided. The method includes maintaining a communicative coupling between the control module and a connector via a port disposed on the control module. The method includes preventing communicative coupling between the control module and the high voltage industrial device while maintaining the communicative coupling between the control module and the connector. The method also includes receiving power into the control module from the connector via the port and exchanging data between the control module and a computer via the port and the connector.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

References in the specification to "one embodiment", "an embodiment", "an exemplary embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
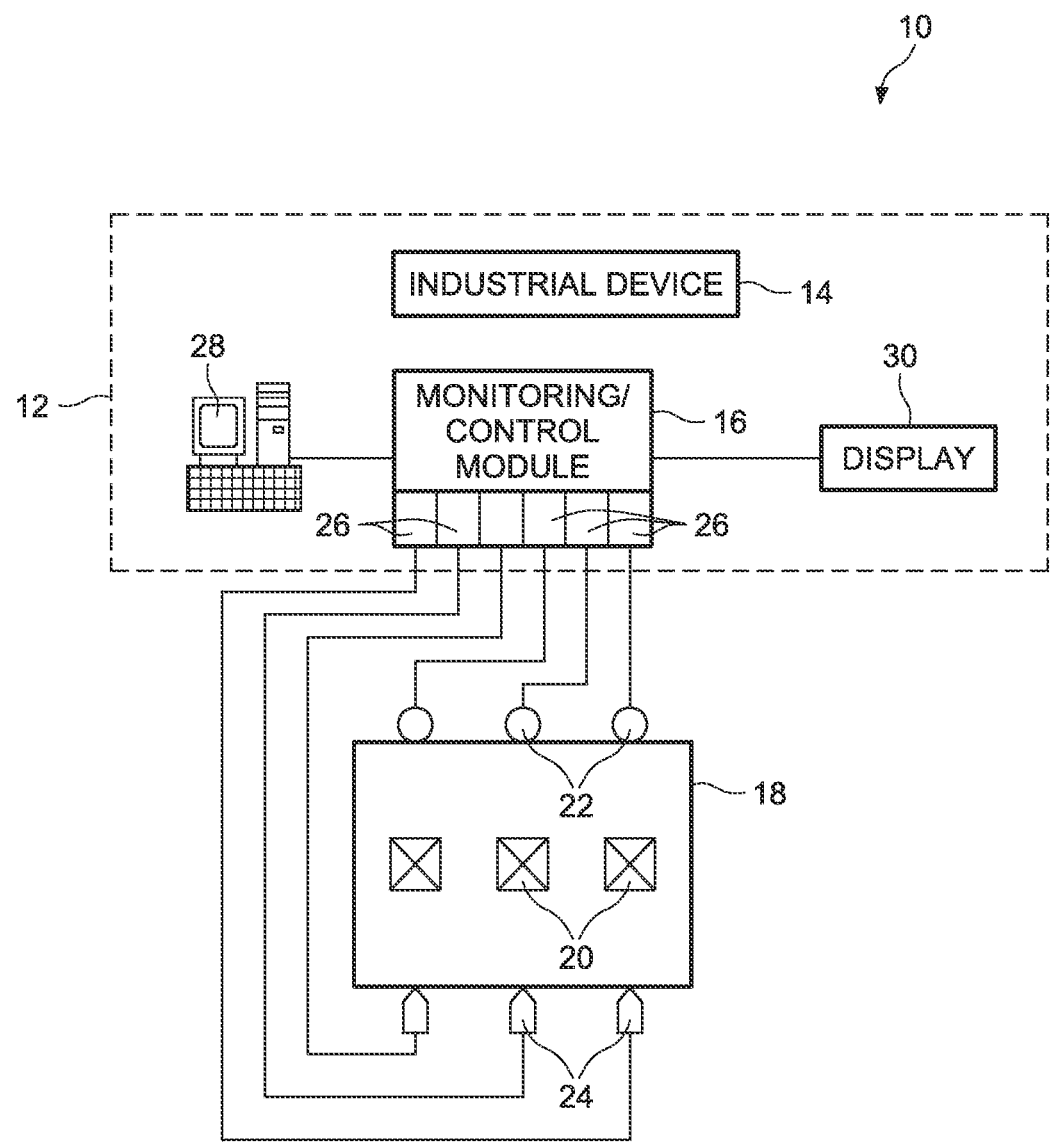
FIG. 1 is a block diagram that illustrates an exemplary industrial automation and control system in accordance with aspects of the present technique.

Turning now to the drawings and referring first to FIG. 1 an exemplary industrial automation and control system 10 is illustrated. The system 10 includes an enclosure 12, such as an electrical cabinet or motor control center, in which electrical components such as monitoring and/or control components are housed. Example components in the unit may include motor drives, relays, motor starters, and programmable logic controllers (PLC), among others. The enclosure 12 may be suitable, for example, for a motor control center or use with industrial, commercial, marine, or other electrical systems. The enclosure 12 may be made of any suitable material, such as heavy gage sheet metal, reinforced plastics, and so forth. In certain embodiments, the enclosure 12 includes individual compartments or other structures that support the electrical components.

In the illustrated embodiment, the system 10 includes an industrial device such as a motor drive 14. The system 10 also includes other industrial devices such as a monitoring/control module 16 assembled in accordance with present techniques and adapted to interface with components of a machine system/process 18. It should be noted that such an interface in accordance with embodiments of the present techniques may be facilitated by the use of certain network strategies. Indeed, an industry standard network may be employed, such as DeviceNet, to enable data transfer. Such networks permit the exchange of data in accordance with a predefined protocol, and may provide power for operation of networked elements.

The process/system 18 may take many forms and include devices for accomplishing many different and varied purposes. For example, the process/system 18 may comprise a compressor station, an oil refinery, a batch operation for making food items, a mechanized assembly line, and so forth. Accordingly, the process/system 18 may comprise a variety of operational components generally represented by reference numeral 20, such as electric motors, valves, actuators, temperature elements, pressure sensors, or a myriad of manufacturing, processing, material handling and other applications. Further, the process/system 18 may comprise control and monitoring equipment for regulating process variables through automation and/or observation. For example, the illustrated process/system 18 comprises sensors 22 and actuators 24. The sensors 22 may comprise any number of devices adapted to provide information regarding process conditions. The actuators 24 may include any number of devices adapted to perform a mechanical action in response to an input signal.

As illustrated, these sensors 22 and actuators 24 are in communication with the monitoring/control module 16 (e.g., a programmable logic controller). In one embodiment, the sensors 22 and actuators 24 may communicate with the monitoring/control module 16 via one or more I/O modules 26 coupled to the monitoring/control module 16. The I/O modules 26 may transfer input and output signals between the monitoring/control module 16 and the controlled process/system 18. In certain embodiments, these devices (sensors 22 and actuators 24) may be utilized to operate process equipment. Indeed, they may be utilized within process loops that are monitored and controlled by the process/system 18. Such a process loop may be activated based on process inputs (e.g., input from a sensor 22) or direct operator input received through a user interface device 28.

The I/O modules 26 may be integrated with the control/monitoring device 16, or may be added or removed via expansion slots, bays or other suitable mechanism. For example, to add functionality to the control/monitoring device 16, additional I/O modules 26 may be added. This may be done when new sensors 22 or actuators 24 are added to control the process/system 18. These I/O modules 26 serve as an electrical interface to the monitoring/control module 16 and may be located proximate or remote from the controller including remote network interfaces to associated systems.

The I/O modules 26 may include input modules that receive signals from input devices such as photo-sensors and proximity switches, output modules that use output signals to energize relays or to start motors, and bidirectional I/O modules, such as motion control modules which can direct motion devices and receive position or speed feedback. In some embodiments, the I/O modules 26 may convert between AC and DC analog signals used by devices on a controlled machine or process and DC logic signals used by the controller. Additionally, some of the I/O modules 26 may provide digital signals to digital I/O devices and receive digital signals from digital I/O devices. Further, in some embodiments, the I/O modules 26 that are used to control motion devices or process control devices may include local microcomputing capability on the I/O modules 26.

In some embodiments, the I/O modules 26 may be located in close proximity to a portion of the control equipment, and away from the remainder of the controller. Data is communicated with remote modules over a common communication link, or network, wherein modules on the network communicate via a standard communications protocol. Many industrial controllers can communicate via network technologies such as Ethernet (e.g., IEEE802.3, TCP/IP, UDP, EtherNet/IP, and so forth), ControlNet, DeviceNet, or other network protocols (Foundation Fieldbus (H1 and Fast Ethernet) Modbus TCP, Profibus) and also communicate to higher level computing systems. In the illustrated embodiment, the system 10 also includes a display 30 such as an LCD or other display. The display 30 is configured to display output parameters such as operating parameters of the process/system 10, temperature and pressures sensed by the sensors 22, position information of the actuators 24 and so forth.

In the illustrated embodiment, the industrial devices, such as the motor drive 14 and the monitoring/control module 16, are programmable devices that can be programmed by a user to perform control and other desired functions. In particular, such devices include a control module that is removably coupled with the device and includes a port to facilitate communicative coupling with a connector capable of supplying power and data communication, as will be described below with reference to FIGS. 2-4.

Figure 2:
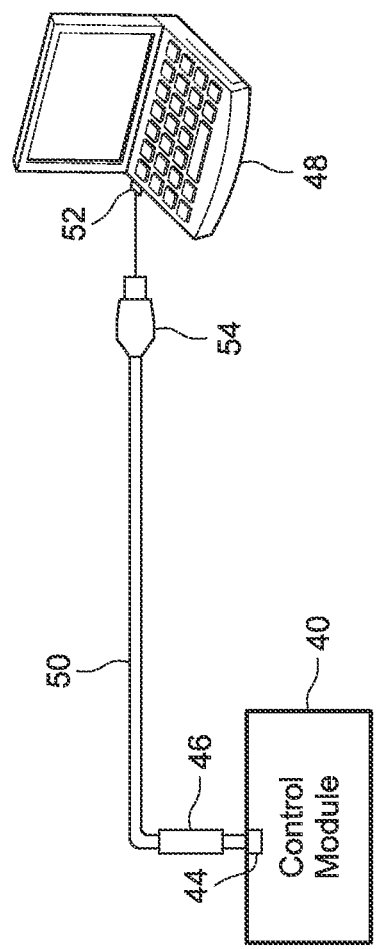
FIG. 2 illustrates equipment utilized in programming of a control module of the industrial device of FIG. 1 in accordance with aspects of the present technique.
Figure 2:
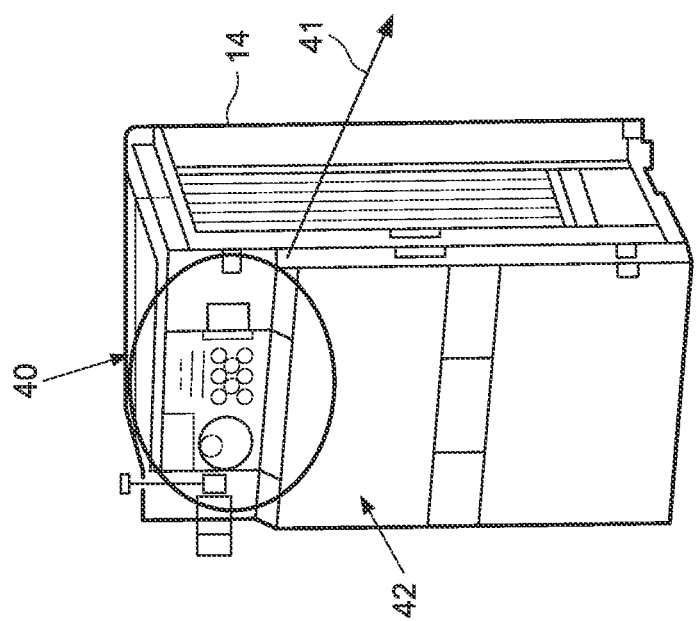

FIG. 2 illustrates equipment in accordance with present embodiments being utilized in programming of a control module 40 of the industrial device 14 of FIG. 1. Specifically, FIG. 2 illustrates the control module 40 incorporated with or communicatively coupled with the industrial device 14 and removed from the industrial device 14 for programming, updating, or the like. Removal of the control module 40 is illustrated by arrow 41. The industrial device 14 may include a motor drive, a smart motor controller (SMC), an uninterrupted power supply (UPS), or a programmable logic controller (PLC), among others. In the illustrated embodiment of the industrial device 14, the control module 40 is coupled to a surface, such as a side wall 42, of the industrial device 14 through a coupling feature (not shown). However, the location of the control module 40 may vary based upon the type and configuration of the industrial device 14.

The coupling feature facilitates removable attachment of the control module 40 with the industrial device 14. The coupling feature may include a bolt-coupling or a snap-fit coupling. In certain embodiments, the control module 40 may be coupled to the industrial device 14 by pressing and sliding the control module 40 down along the wall 42 of the industrial device 14 such that coupling features of the control module 40 and industrial device 14 are engaged. The coupling feature may further include hooks, slots and other structures for securing the control module 40 to the industrial device 14.

The control module 40 further includes a communicative coupling feature (not shown) configured to facilitate communication between the control module 40 and the industrial device 14 when coupled with a corresponding communicative coupling feature of the industrial device 14. The communicative coupling features of the control module 40 and the industrial device 14 may include a high speed serial link, USB port, or other suitable communication devices.

The control module 40 also includes a port 44 configured to communicatively couple with a connector 46 capable of supplying power and data communication to the control module 40. The port 44 is configured to receive power via the connector 46 and exchange data with a computer 48 via the connector 46. In this exemplary embodiment, the connector 46 includes a universal serial bus (USB) connector and the data and power are supplied to the control module 40 through a USB cable 50 that is communicatively coupled to a port 52 of the computer 48 via a connector 54. Using the illustrated communicative coupling, the control module 40 may be programmed using the computer 48 for performing control, monitoring or other desired functions.

In one embodiment, the port 44 is positioned on the industrial device 14 such that the port 44 is inaccessible while the control module 40 is coupled with the industrial device 14. Thus, a user is required to physically decouple the control module 40 from the industrial device 14 to access the port 44 prior to programming of the control module 40 using the port 44. When the control module 40 is removed from its coupling with the industrial device 14, the control module 40 is no longer receiving power from the industrial device 14. That is, removing the control module 40 from coupling with the industrial device 14 also removes the control module 40 from the high voltage circuitry of the industrial device 14. The control module 40 can then be operated using substantially less power from the computer 48 without requiring electrical isolation of the USB port 44. Indeed, as illustrated in FIG. 2, the control module 40 can be detached 41 from the industrial device 14 and coupled with the computer 48 for programming without requiring electrical isolation circuitry, which can be expensive. Because the port 44 is inaccessible while the control module 40 is coupled to the industrial device 14, no isolation circuitry is necessary because the control module 40 can only be programmed while disconnected from the industrial device 14.

Figure 3:
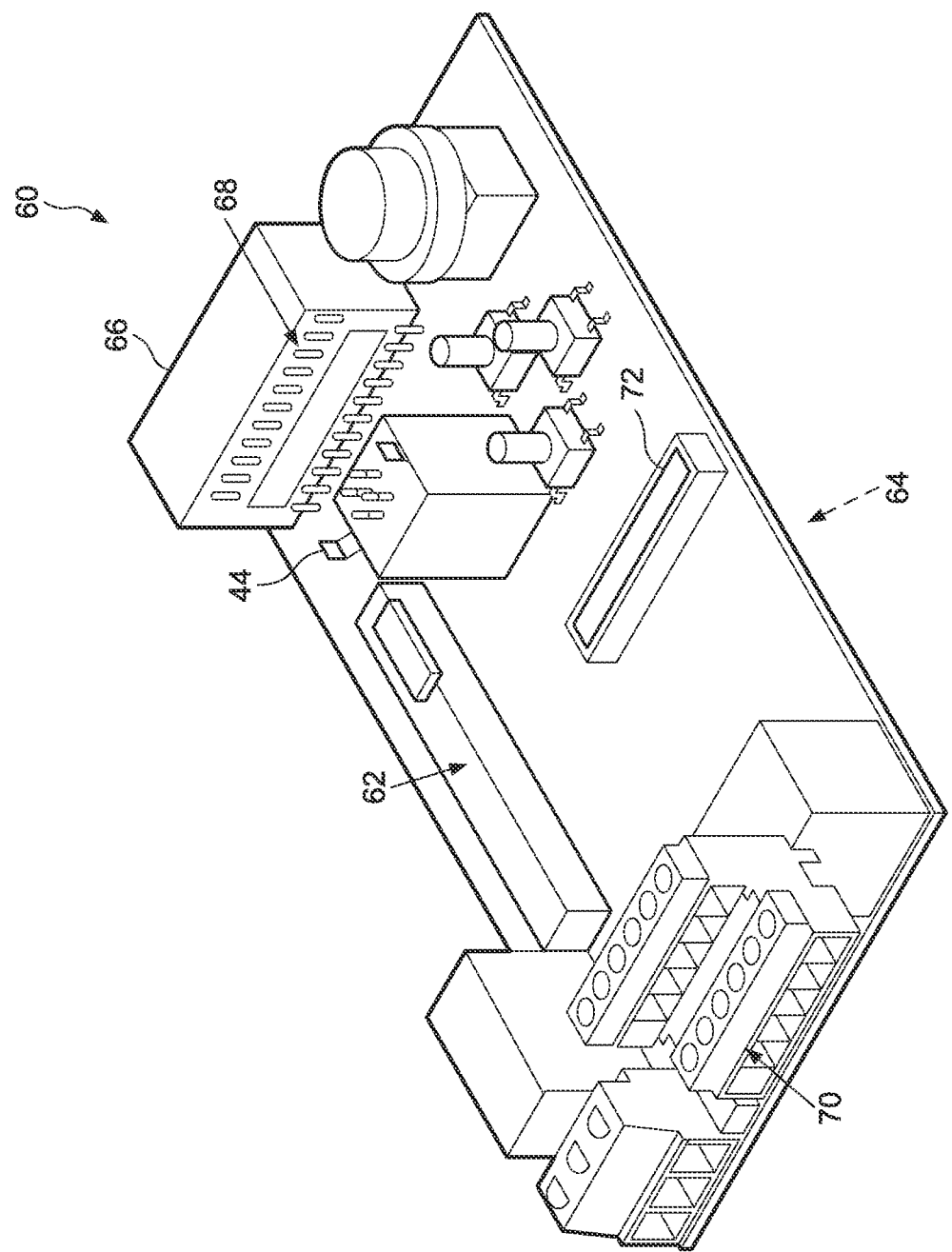
FIG. 3 illustrates an exemplary configuration of the control module of FIG. 2 in accordance with aspects of the present technique.

FIG. 3 illustrates an exemplary configuration 60 of the control module 40 of FIG. 2. In the illustrated embodiment, the control module 60 has been decoupled from an industrial device such as an AC motor drive. As illustrated, the control module 60 includes a variety of components for performing control, monitoring and other desired functions. The control module 60 also includes several communication features that enable communication between the control module 60 and the industrial device 14 or communication between the control module 60 and the computer 48. For example, the control module 60 includes a communicative coupling feature 62, which is illustrated as a connector extending from a bottom surface 64 of the control module 40. The communicative coupling feature 62 is configured to facilitate communication between the control module 40 and the industrial device 14 when it is coupled with a corresponding communicative coupling feature of the industrial device 14. For example, the industrial device 14 may supply power to the control module 40 and receive commands from the control module 40 via the communicative coupling feature 62. The communicative coupling feature 62 may be arranged with respect to the communicative coupling features of the industrial device 14 such that they engage with one another when the control module 40 is installed in the industrial device 14. In one exemplary embodiment, the communicative coupling 62 includes a high speed serial link. In another exemplary embodiment, the communicative coupling 62 includes a USB connector configured to couple with a corresponding USB port of the industrial device 14. In one exemplary embodiment, the communicative coupling feature 62 includes power circuitry (not shown) configured to receive power from the industrial device 14 when coupled with the corresponding communicative coupling feature of the industrial device 14.

The control module 60 includes a user interface 66 configured to facilitate programming of the control module 60, when the computer 48 is not used for programming the control module 60. The user interface 66 may include graphical objects such as buttons, text fields, menus and a display configured to allow an operator of the industrial device 14 to provide input parameters and facilitate programming of the control module 60. The user interface 66 may be attached to the control module 60 by placing it inside a receptacle 68.

The control module 60 further includes other coupling features such as a connector 70 including digital and analog input-output (I/O) terminals to connect the control module 60 to a control system or other devices. For example, the connector 70 may connect the control module 60 to a PLC, switches, lights, or other suitable devices. Moreover, the control module 60 includes another connector 72 for facilitating operation of other user-defined options. In one embodiment, the connector 72 includes a serial communications port for a user to install advanced industrial network cards, such as Ethernet or Devicenet. Again, a variety of coupling mechanisms may be used to communicate with the features 70 and 72.

In the illustrated embodiment, the control module 60 further includes the port 44, which is integral with the control module 60 and configured to communicatively couple with the connector 46, as illustrated in FIG. 2. The port 44 is configured to receive power via the connector 46 and exchange data with the computer 48 via the connector 46. In one exemplary embodiment, the port 44 includes a USB port. The port 44 is located on the control module 60 such that the port 44 is inaccessible while the control module 60 is coupled with the industrial device 14.

In certain embodiments, when the control module 60 is installed on the industrial device 14, the port 44 is facing a surface such as a wall of the industrial device 14, or is engaged with a blocking feature (e.g., a dummy plug) to prevent access to the port 44 while the control module 60 is coupled to the industrial device 14. A variety of such locations may be utilized for the port 44 on the control module 60 such that the port 44 is only accessible when detached from the industrial device 14 and isolated from high voltage circuitry of the industrial device 14. In the illustrated embodiment set forth in FIG. 3, the port 44 is configured to receive power from the computer 48 via the connector 46 while the control module 60 is decoupled from the industrial device 14. Moreover, the port 44 is not electrically isolated from the communicative coupling feature of the control module 60. That is, because the port 44 is only accessible when the control module 60 is decoupled from the industrial device 14, there is no electrical isolation circuitry associated with the port 44.

In operation, the control module 60 is decoupled from the industrial device 14 using activated removable attachment features. The port 44 is then coupled with the connector 46 to receive programming information and other input parameters from the computer 48. The programming information may include any data, software, or firmware that is used to define the performance of the industrial device 14. In certain embodiments, the programming information may include operating parameters, parameter customization data, and firmware for the industrial device 14 or any peripherals. Often, certain aspects of the programming information will be determined by a manufacturer, OEM, system integrator, or other service provider and are transferred to the industrial device 14. Furthermore, periodic updates of the programming configurations or operational codes may take place, such as when certain components of the industrial device 14 are replaced, any application of the industrial device 14 is altered, or firmware is updated. During the programming operation, the control module 60 receives power from the computer 46 via the port 44. Once the programming is completed, the control module is re-attached to the industrial device 14.

Figure 4:
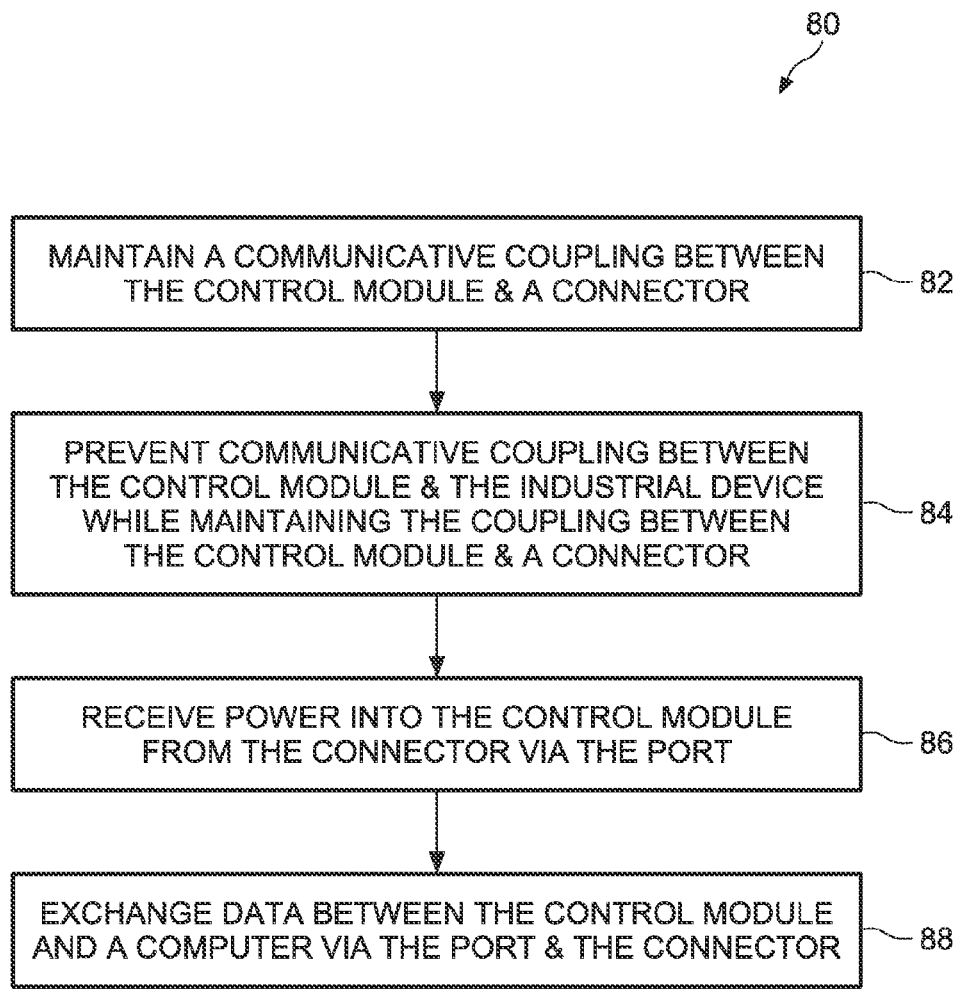
FIG. 4 illustrates a process flow diagram representing an exemplary method for programming a control module of an industrial device in accordance with aspects of the present technique.

FIG. 4 illustrates a process flow diagram representing an exemplary method 80 for programming a control module of an industrial device in accordance with aspects of the present technique. At block 82, a communicative coupling between the control module and a connector is maintained via a port disposed on the control module. In one embodiment, the port is coupled to a USB connector. Moreover, communicative coupling between the control module and the industrial device is prevented while maintaining the communicative coupling between the control module and the connector (block 84). The control module is initially decoupled from the industrial device by activating removable attachment features prior to coupling the port to the USB connector.

At block 86, power is received into the control module from the connector via the port. The power is supplied to the control module from a computer via the port. Further, data is exchanged between the control module and the computer via the port and the connector (block 88). In certain embodiments, the data includes programming instructions for the industrial device. Alternative, the data may include other information such as operating parameters of the industrial device, user manuals, set-up tools and so forth. In this exemplary embodiment, the control module is operated without isolation of the port from other power supply circuitry of the control module. Thus, the control module is programmed through the port without the need of an isolation circuit for isolating the port from the high voltage circuitry of the industrial device thereby providing substantial cost savings.

The various aspects of the structures described hereinabove may be used for remotely programming or configuring industrial devices, such as those typically found in industrial automation and control systems. As described above, the technique provides low-cost USB connection for communicatively coupling the industrial devices to a computer for performing programming operations. Advantageously, the configurations of the programmable control module described above allow remote programming of the module without the need of electrical isolation circuitry to prevent damage from the high voltage industrial devices.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A control module for an industrial device, the control module comprising:
   a coupling feature configured to facilitate removable attachment of the control module with the industrial device;
   a communicative coupling feature configured to facilitate communication between the control module and the industrial device when coupled with a corresponding communicative coupling feature of the industrial device, wherein the communicative coupling feature comprises power circuitry configured to receive power from the industrial device when coupled with the corresponding communicative coupling feature of the industrial device; and
   a port configured to communicatively couple with a connector, wherein the port is configured to receive power from a computer via the connector and exchange data with the computer via the connector, wherein the port is not electrically isolated from the communicative coupling feature, and the port is inaccessible by the connector based on a location of the port on the control module while the control module is coupled with the industrial device by the coupling feature, wherein the industrial device is configured to block access to the port when the control module is coupled with the industrial device via the coupling feature.

2. The control module of claim 1, wherein the port is configured to communicatively couple with a universal serial bus (USB) connector.

3. The control module of claim 1, wherein the power circuitry is configured to receive power at a first power level and the port is configured to receive power at a second power level that is substantially lower than the first power level.

4. The control module of claim 1, wherein the port is disposed on a surface of the control module such that the port faces toward internal components of the industrial device while the control module is coupled with the industrial device.

5. The control module of claim 1, wherein the port is configured to engage with a blocking feature of the industrial device to prevent access to the port while the control module is coupled with the industrial device.

6. The control module of claim 1, wherein the coupling feature comprises a bolt-coupling or a snap-fit coupling.

7. The control module of claim 1, wherein the coupling feature is configured to couple with a motor drive, smart motor, or uninterruptable power supply.

8. The control module of claim 1, wherein the port is configured to receive sufficient power from the connector to supply power needs of the control module when the control module no longer receives power from the industrial device.

9. An industrial automation system, comprising:
   an industrial device;
   a control module removably coupled with the industrial device such that the control module communicates with and receives power via the industrial device; and
   a port integral with the control module and configured to communicatively couple with a connector configured to supply power and data communication, wherein the port is configured to receive power via the connector and exchange data with a computer via the connector, and the port is inaccessible by the connector based on a location of the port on the control module removably coupled with the industrial device, wherein the industrial device is configured to block access to the port when the control module is coupled with the industrial device, and wherein the port is not electrically isolated from the industrial device while the control module is removably coupled with the industrial device.

10. The industrial automation system of claim 9, wherein the port is engaged with a blocking feature of the industrial device while the control module is removably coupled with the industrial device.

11. The industrial automation system of claim 9, wherein the port comprises a universal serial bus (USB) port.

12. A method for programming a control module for a high voltage industrial device, comprising:
   maintaining a first communicative coupling between the control module and a connector via a port disposed on the control module;
   preventing a second communicative coupling between an additional port disposed on the control module and a communicative coupling feature of the high voltage industrial device while maintaining the first communicative coupling between the control module and the connector, wherein the port is not electrically isolated from the communicative coupling feature, and wherein the additional port comprises power circuitry configured to receive power from the industrial device when coupled with the communicative coupling feature of the industrial device, wherein preventing the second communicative coupling is based on a location of the port in relation to the communicative coupling feature of the high voltage industrial device, wherein the high voltage industrial device is configured to block access to the additional port when the control module is coupled with the industrial device;
   receiving power into the control module from a computer via the port; and
   exchanging data between the control module and the computer via the port and the connector.

13. The method of claim 12, wherein maintaining the first communicative coupling between the control module and the connector comprises coupling the port to a universal serial bus (USB) connector.

14. The method of claim 12, comprising initially decoupling the control module from the high voltage industrial device via activated removable attachment features.

15. The method of claim 12, comprising operating the control module without isolation of the port from other power supply circuitry of the control module.

16. The method of claim 12, wherein preventing the second communicative coupling between the additional port of the control module and the high voltage industrial device comprises physically blocking interaction between the additional port and the high voltage industrial device as a result of the first communicative coupling.

* * * * *